United States Patent
Bavishi et al.

(10) Patent No.: US 10,990,548 B1
(45) Date of Patent: Apr. 27, 2021

(54) QUALITY OF SERVICE LEVELS FOR A DIRECT MEMORY ACCESS ENGINE IN A MEMORY SUB-SYSTEM

(71) Applicant: Micron Technology, Inc., Boise, ID (US)

(72) Inventors: Dhawal Bavishi, San Jose, CA (US); Laurent Isenegger, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/694,935

(22) Filed: Nov. 25, 2019

(51) Int. Cl.
*G06F 13/28* (2006.01)
*G06F 13/16* (2006.01)
*G06F 3/06* (2006.01)

(52) U.S. Cl.
CPC ............ *G06F 13/28* (2013.01); *G06F 3/0604* (2013.01); *G06F 3/0659* (2013.01); *G06F 3/0679* (2013.01); *G06F 13/1673* (2013.01)

(58) Field of Classification Search
CPC .... G06F 13/28; G06F 13/1673; G06F 3/0604; G06F 3/0659; G06F 3/0679
See application file for complete search history.

(56) References Cited

U.S. PATENT DOCUMENTS

| | | | | |
|---|---|---|---|---|
| 2009/0100200 A1* | 4/2009 | Bouvier | .................. | G06F 13/28 710/26 |
| 2011/0131375 A1* | 6/2011 | Noeldner | .................. | G06F 3/00 711/114 |
| 2013/0111077 A1* | 5/2013 | Gowravaram | .......... | G06F 13/28 710/22 |
| 2018/0107621 A1* | 4/2018 | Sanghai | ................ | G06F 13/364 |

\* cited by examiner

*Primary Examiner* — Henry Tsai
*Assistant Examiner* — John B Roche
(74) *Attorney, Agent, or Firm* — Lowenstein Sandler LLP

(57) ABSTRACT

A processing device, operatively coupled with a plurality of memory devices, is configured to receive a direct memory access (DMA) command for moving a plurality of data sectors from a source memory region to a destination memory region, the DMA command comprising a priority value. The processing device further assigns the DMA command to a priority queue of a plurality of priority queues based on the priority value of the DMA command, each priority queue has a corresponding set of priority values. The processing device also determines an execution rate for each priority queue of the plurality of priority queues. The processing device then executes a plurality of DMA commands from the plurality of priority queues according to the corresponding execution rate of each priority queue.

20 Claims, 7 Drawing Sheets

QUALITY OF SERVICE LEVELS FOR A DIRECT MEMORY ACCESS ENGINE IN A MEMORY SUB-SYSTEM

TECHNICAL FIELD

The present disclosure generally relates to memory sub-systems, and more specifically, relates to supporting quality of service levels in a direct memory access engine in a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
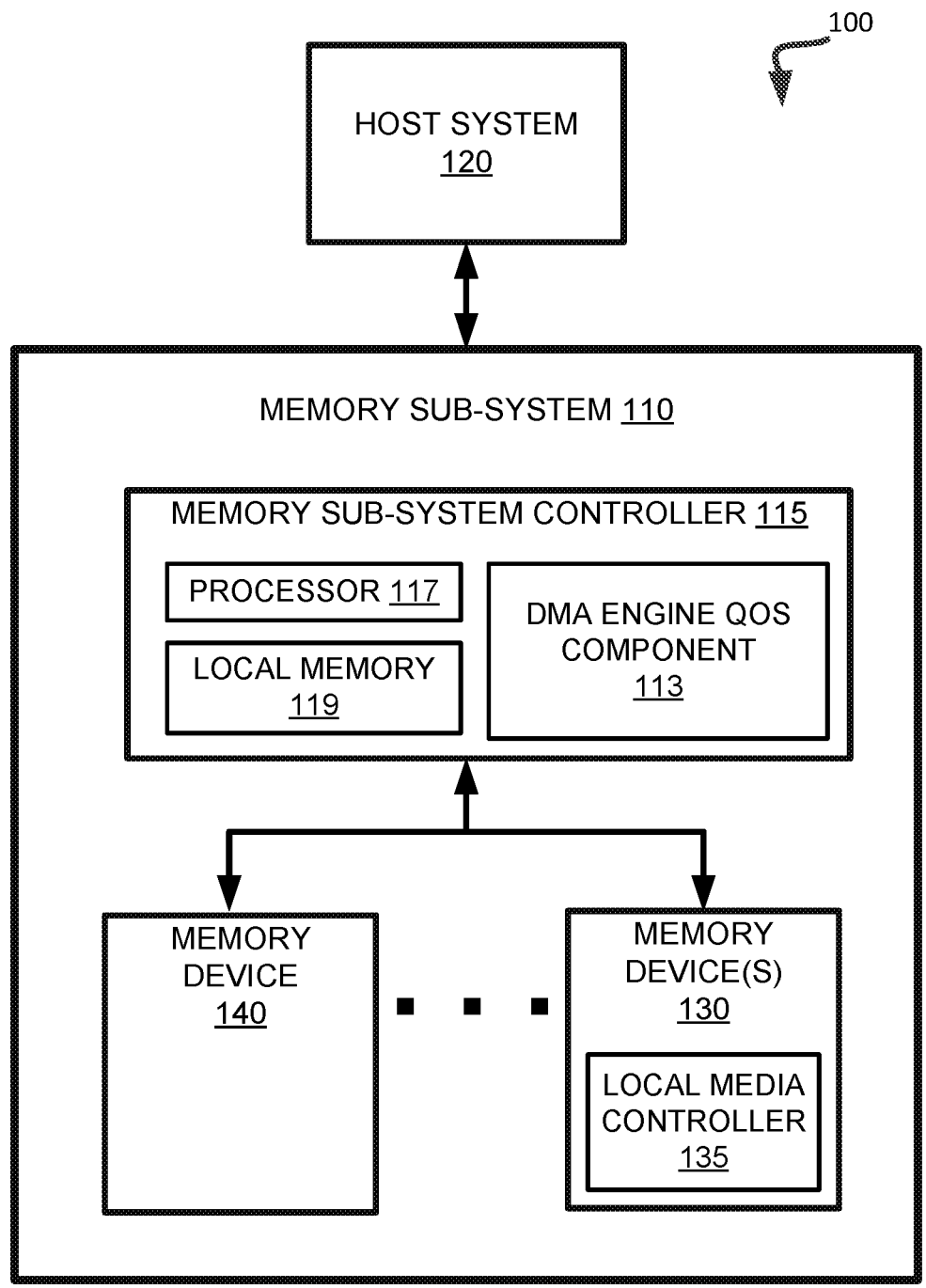
FIG. 1 illustrates an example computing environment for supporting quality of service levels in a direct memory access (DMA) engine in a memory sub-system, in accordance with some embodiments of the present disclosure.

Aspects of the present disclosure are directed to supporting quality of service (QoS) levels when processing direct memory access (DMA) commands in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

Conventional DMA engines processes DMA commands by moving data from a source address space to a destination address space for the same or a different memory device within the memory sub-system. The DMA command includes a source address, a destination address, and a number of bytes to move from the source address to the destination address. A DMA engine is a hardware-based component of the memory sub-system that is configured to perform direct memory transfer from a source memory region to a destination memory region. Conventional DMA engines assumes the same level of QoS is to be provided to each DMA command. Therefore, the DMA commands are processed in the order of their arrival at the DMA engine (e.g., first come first served). Similarly, data sectors that will be moved as a result of executing the DMA command are read from the source memory address space and into the destination address space simultaneously, assuming the same level of QoS for processing the multiple data sectors.

The evolution of server architecture and the availability of multi-core processors has encouraged significant changes to server design. Most notably, servers running a single operating system (OS) have been replaced by multi-tenants servers, where a number of "owners" (e.g., guest operating systems running in virtual machines (VMs), containers, or microservices) share the same physical server platform and all of its resources (including memory sub-systems), unaware of the existence of each other. In many circumstances, each VM can have a Service Level Agreement (SLA) defining a certain level of service, including quality, availability, responsibilities, etc. that is to be provided. In certain circumstances, meeting the SLA of the memory sub-system can be challenging when each VM is expected to receive the same level of quality of service (QoS). Similarly, each memory device of the memory sub-system can have its own SLA that can require a varying level of QoS than other memory devices of the memory sub-system. Therefore, a solution for introducing QoS levels to DMA commands and to processing data sectors within each DMA command can be desirable in order to improve the latency of processing DMA commands from memory devices or VMs with high levels of QoS.

Aspects of the present disclosure address the above and other deficiencies by having a memory sub-system that provides a mechanism so that DMA commands, as well as data sectors within DMA commands, can be serviced at different Quality of Service (QoS) levels, such that the conditions of a system service level agreement (SLA) of the DMA command initiator can be met. In implementations, a DMA command initiator can assign one of a predetermined set of priority values to each DMA command. Priority values can determine the level of QoS of the memory device initiating the DMA command, such that a high priority value indicates a higher level of QoS. Similarly, a low priority value indicates a lower level of QoS of the device or component initiating the DMA command.

In one embodiment, when a DMA command is received by a DMA engine, the DMA engine can assign the DMA command to a priority queue according to the priority value of the DMA command. In implementations, the DMA engine can have multiple priority queues for storing DMA commands received at the DMA engine for execution. Each priority queue can have a range of priority values associated with the priority queue, such that a DMA command can be assigned to the priority queue if the DMA command priority value falls within the range of priority values associated with the priority queue. In certain implementations, each priority queue can have an execution rate, determining the number of DMA commands that can be selected for execution from the priority queue before switching to the next priority queue of the DMA engine.

When executing DMA commands, the DMA engine can retrieve a DMA command for execution from one of the multiple priority queues of the DMA engine, based on the execution rate of each priority queue. In implementations, the DMA engine can utilize a weighted round robin selection scheme to select DMA commands from the multiple priority queues. Weighted round robin selection allows one priority queue to be allocated some greater amount of bandwidth than another priority queue, such that a group of two or more DMA commands can be executed each time the priority queue with high execution rate is visited. For example, the DMA engine can execute ten DMA commands from the first priority queue with execution rate of ten before switching to the second priority queue with execution rate of two, and then execute two DMA commands from the second priority queue before switching back to the first priority queue, and so on.

In implementations, the DMA engine can modify the execution rate of a priority queue to enable more or less DMA commands to be executed from the priority queue. For example, if a priority queue that is associated with low priority values has not been serviced for a certain time period due to low execution rate of the priority queue, the DMA engine can increase the execution rate of the priority queue to allow for more DMA commands to be executed from the priority queue. Increasing the execution rate results in executing more DMA commands from the priority queue, thus preventing excessive latency for the memory devices that initiated the DMA commands in the priority queue.

Furthermore, another level of QoS can be assigned to data sectors within a DMA command, such that certain data sectors can be read from a source memory region and written to a destination memory region before the other data sectors of the same DMA command. In implementations, a DMA command initiator can assign a sector priority value to each data sector of the data sectors of the DMA command. Sector priority values can be relative values that can be assigned to data sectors of the same DMA command, such that a data sector with a higher sector priority value can be read from the source memory region and written to the destination memory region before another data sector of the same DMA command when the other data sector has a lower sector priority value. In implementations, the DMA command initiator can create data sector priority map and add the map to the DMA command. In other implementations, the DMA command can contain a list of ranges of data sectors and a corresponding sector priority value for each range of data sectors. When the DMA engine processes a DMA command that includes data sectors of various sector priority values, the DMA engine can read the data sectors with the highest priority value from the memory source into DMA buffers, followed by reading data sectors with the second highest priority values from the memory source into DMA buffers, and so on. When all data sectors have been read into the DMA buffers, the DMA engine can write the data sectors into the destination memory region according to the same criteria (e.g. data sectors with the highest priority values are written to the destination memory first, followed by data sectors with the second highest priority values, and so on until all data sectors are written to the destination memory region).

Supporting QoS levels in a DMA engine command techniques described herein allow a memory sub-system to execute certain DM commands sooner than others, according to the level of QoS of the DMA command initiator. This ability enables the memory sub-system to support various levels of QoS of memory devices, satisfying the SLA requirements of the memory devices. The ability to prioritize the execution of DMA commands further allows for a more predictable QoS for each memory device initiating DMA commands because a memory device with high QoS does not need to wait for DMA commands from a memory device with lower QoS level to be executed first. For example, DMA commands from the host of the memory sub-system can have a high priority value whereas DMA commands internal to the memory sub-system can have a low priority value. This can result in improving the overall latency of memory access requests coming from the host system, as well as providing a more predictable processing time for DMA commands initiated by the host system. Moreover, in certain circumstances, a DMA command initiator can require certain data sectors of a DMA command to be moved from a source memory space sooner than other data sectors. For example, certain data sectors can be required to be moved from the main memory to the cache as soon as possible to support the fast cache processing time. The technique described herein of supporting sector priority levels among data sectors of the DMA command satisfies this requirement by enabling the DMA engine to process marked data sectors sooner than other data sectors of the DMA command.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A 3D cross-point memory device is a cross-point array of non-volatile memory cells that can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point type and NAND type flash memory is described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115)

can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes DMA engine QoS component 113 that can be used to support different QoS levels for executing DMA commands and for moving data sectors within DMA commands received at DMA engine QoS component 113. In implementations, DMA engine can be a component of memory sub-system controller 115. In certain implementations, a DMA command initiator of a memory device 130-140 can assign a priority values to each DMA command. Priority values can determine the level of QoS of the memory device initiating the DMA command, such that a high priority value indicates a higher level of QoS. Similarly, a low priority value indicates a lower level of QoS of the memory device initiating the DMA command. For example, a DMA command with a high priority value can be processed before another DMA command with a lower priority value.

When a DMA command is received at a DMA engine, DMA engine QoS component 113 can retrieve the priority value from the DMA command and assign the DMA command to a priority queue according to the priority value of the DMA command. In implementations, DMA engine QoS component 113 can have multiple priority queues for storing DMA commands received at the DMA engine for execution. In an example, each priority queue can have a range of priority values associated with the priority queue, such that a DMA command can be assigned to the priority queue if the DMA command priority value falls within the range of priority values associated with the priority queue. In another example, a priority queue can have a single priority value associated with the priority queue, and a DMA command can be assigned to the priority queue if the DMA command priority value matches the priority value associated with the priority queue. In implementations, each priority queue can have an execution rate, determining the number of DMA commands that can be selected for execution from the priority queue before switching to the next priority queue of the DMA engine. For example, in a system with two priority queues, one priority queue that is associated with high priority values can have an execution rate of ten, while another priority queue that is associated with low priority values can have an execution rate of one. In this case, the DMA engine can execute ten DMA commands from the first priority queue, followed by executing one DMA command from the second priority queue, followed by executing ten DMA commands from the first priority queue, and so on.

When executing DMA commands, DMA engine QoS component 113 can retrieve a DMA command for execution from one of the multiple priority queues of the DMA engine, based on the execution rate of each priority queue. For example, the DMA engine can start a weighted round robin selection scheme to select DMA commands from the multiple priority queues. Popular selection schemes include round robin and weighted round robin. In round robin selection, the DMA engine visits each priority queue in order, executing a single DMA command from that queue on each visit (although empty queues may be skipped). For example if there are two priority queues, the DMA engine can execute one DMA command from the first queue, then one DMA command from the second queue, then one DMA command from the first queue again, and so on. With weighted round robin selection, one priority queue can be allocated some greater amount of bandwidth than another priority queue, such that a group of two or more DMA commands can be executed each time the priority queue with high execution rate is visited.

In implementations, in order to allow for improving the overall latency of the memory sub-system, DMA engine QoS component 113 can modify the execution rate of a priority queue to enable more or less DMA commands to be executed from the priority queue. For example, if a priority queue that is associated with low priority values accumulates many DMA commands due to low execution rate of the priority queue, DMA engine QoS component 113 can increase the execution rate of the priority queue. In this case, DMA engine QoS component 113 can execute more DMA commands from the priority queue due to the higher execution rate of the priority queue, thus increasing the frequency of executing DMA commands for this priority queue and resolving the DMA command accumulation issue.

DMA engine QoS component 113 can further support another level of QoS for processing data sectors within a DMA command, such that certain data sectors can be read from a source memory region and written to a destination memory region before other data sectors of the same DMA command. A data sector can refer to a known fixed size memory chunk that can be referenced by a single memory address (e.g. 64 bytes). In implementations, a DMA command initiator can assign a sector priority value to each data sector of the data sectors of the DMA command. Sector priority values can be relative values that can be assigned to data sectors of the same DMA command, such that a data sector with a high sector priority value can be moved from the source memory region to the destination memory region before another data sector with a low sector priority value. In implementations, the DMA command initiator can create data sector priority map and add the map to the DMA command. The data sector priority map can be a data structure containing sector priority values of the data sectors of the DMA command. The priority map can be included as a field in the DMA command. In this case, each data sector of the DMA command can have a corresponding sector priority value in the priority map data structure. In other implementations, the DMA command can contain a list of ranges of data sectors and a corresponding sector priority value for each range of data sectors. For example, for a DMA command for moving 10 contiguous data sectors from a source memory region to a destination memory region, the DMA command can contain a field indicating that the data sectors 0 to 3 each has a sector priority value of 1, data sectors 4 to 6 each has a sector priority value of 2, and data sectors 7 to 9 each has a sector priority value of 1. In this case, since data sectors 4, 5, and 6 each have a high priority value relative to the other data sectors of the DAM command, data sectors 4, 5, and 6 can be read from the source memory region and then written to the destination memory region before the other data sectors of the DMA command.

When DMA engine QoS component 113 processes a DMA command that includes data sectors of various sector priority values, DMA engine QoS component 113 can retrieve the sector priority data structure from the DMA command (e.g., the sector priority map, the sector priority ranges, etc.). Based on the sector priority data structure, DMA engine QoS component 113 can read the data sectors that has the highest priority value from the memory source into DMA buffers first, followed by reading data sectors with the second highest priority value from the memory source into the DMA buffers, and so on. When all data sectors have been read into the DMA buffers, DMA engine QoS component 113 can write the data sectors into the destination memory region in the same order (e.g. data sectors with the highest priority value are written first, followed by data sectors with the second highest priority value, and so on until all data sectors are written to the destination memory region).

Figure 2:
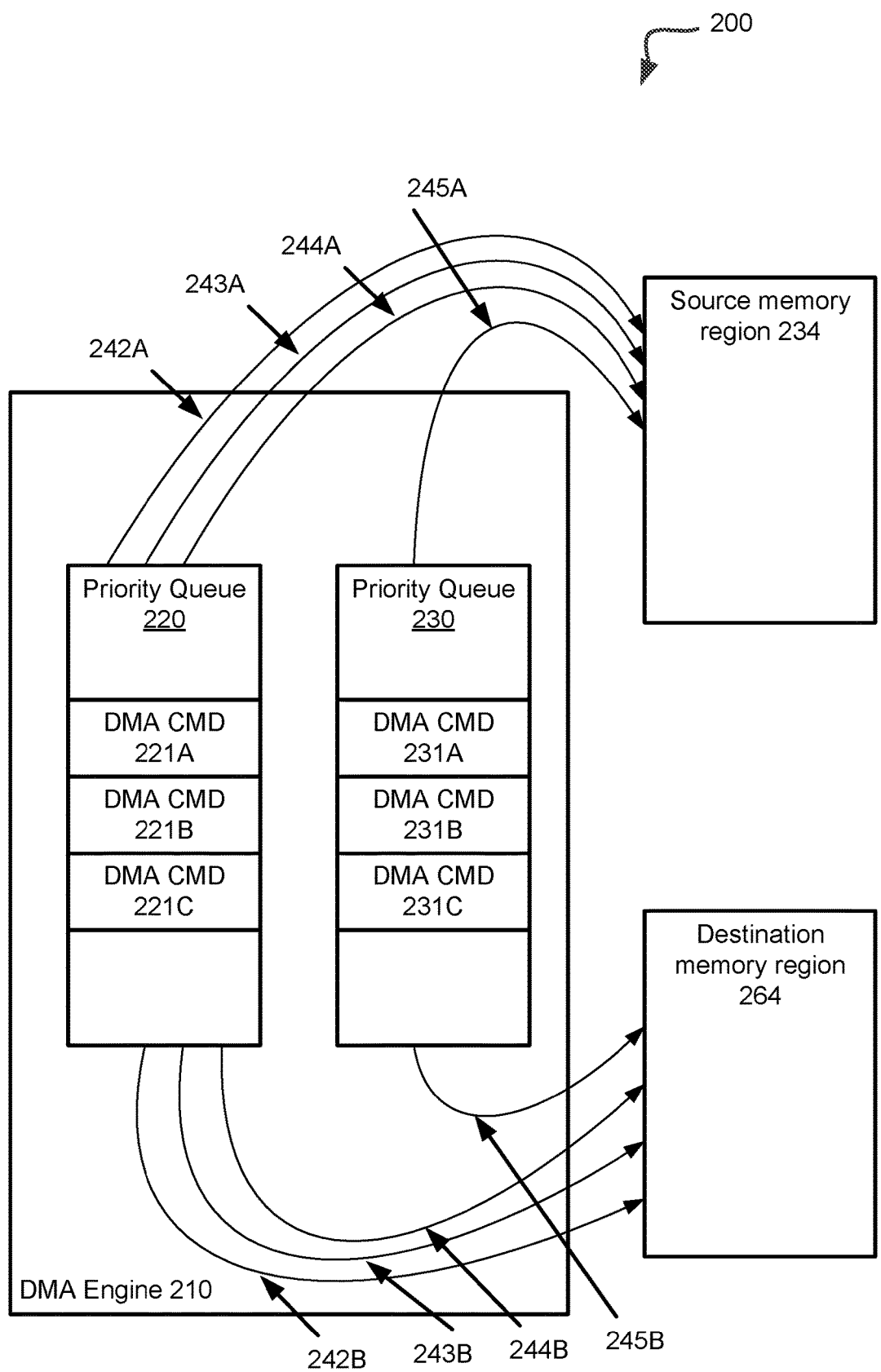
FIG. 2 illustrates an example of the execution of DMA commands from priority queues of a DMA engine in a memory sub-system, in accordance with some embodiments of the present disclosure.

FIG. 2 is a diagram illustrating an example method 200 for the execution of DMA commands from priority queues of a DMA engine in memory sub-system 110, in accordance with some embodiments of the present disclosure. In this example, DMA engine 210 can have priority queue 220 for DMA commands with a high priority value and priority queue 230 for DMA commands with a low priority value. Priority queue 220 can have an execution rate of three and priority queue 230 can have an execution rate of one. DMA commands 221A-C have a priority value of high and as such are assigned to priority queue 220. DMA commands 231A-C have a priority value of low and as such are assigned to priority queue 230.

In implementations, DMA engine 210 can execute DAM commands from priority queues 220 and 230 according to the execution rate of each priority queue. DMA engine 210 can utilize a weighted round robin selection mechanism to select DMA commands from each priority queue for execution. For example, a weighted round robin mechanism can allow DMA engine 210 to execute ten DMA commands from a priority queue with execution rate of 10 before switching to another priority queue with execution rate of two, and then execute two DMA commands from the second priority queue before switching back to the first priority queue, and so on. In this example, DMA engine 210 can execute three DMA commands from priority queue 220 that has execution rate of three, followed by one DMA command from priority queue 230 that has execution rate of one, and so on. In implementations, DMA engine 210 can read data sectors of each DM command from source memory region 234 into DMA buffers then write the data sectors of the DMA command from the DMA buffers into destination memory region 264, before proceeding to executing the next DMA command. DMA engine 210 can keep track of previously executed DMA commands, such that the execution rate of each priority queue can be enforced when selecting the next DMA command to execute, as explained in more details herein.

At operation 242A, DMA engine 210 can execute a first DMA command (e.g., DMA command 221A) out of the three DMA commands that can be selected from priority queue 220. DMA engine can read the data sectors of DMA command 221A from source memory region 234 into DMA buffers (not shown). At operation 242B, DMA engine 210 can write the data sectors of DMA command 212A from the DMA buffers into destination memory region 264, thus completing the execution of DMA command 221A.

At operation 243A, DMA engine 210 can detect that the next DMA command to be executed can be selected from priority queue 220 because only one DMA command (out of three DMA commands allocated for priority queue 220) has been executed. DMA engine 210 can then select DMA command 221B for execution, and can read the data sectors of DMA command 221B from source memory region 234 into the DMA buffers. At operation 243B, DMA engine 210 can write the data sectors of DMA command 221B from the DMA buffers into destination memory region 264, thus completing the execution of DMA command 221B.

Similarly, At operation 244A, DMA engine 210 can detect that the next DMA command to be executed can still be selected from priority queue 220 because only two DMA commands have been executed from priority queue 220. DMA engine 210 can then select DMA command 221C for execution, and can read the data sectors of DMA command 221C from source memory region 234 into the DMA buffers. At operation 244B, DMA engine 210 can write the data sectors of DMA command 221C from the DMA buffers into destination memory region 264, thus completing the execution of DMA command 221C.

At operation 245A, DMA engine 210 can detect that all three DMA command allocated for priority queue 220 have been executed, and can then proceed to select the next DMA command to be executed from priority queue 230. DMA engine 210 can then select DMA command 231A for execution, and can read the data sectors of DMA command 231A from source memory region 234 into the DMA buffers. At operation 245B, DMA engine 210 can write the data sectors of DMA command 231A from the DMA buffers into destination memory region 264, thus completing the execution of DMA command 231A. Since priority queue 230 has an execution rate of only one, during the next execution cycle of a DMA command, DMA engine 210 can detect that the next DMA command can be selected from priority queue 220. In implementations, if priority queue 220 with the high priority DMA commands has no DMA commands, DMA engine 210 can decide to execute the next DMA command from another priority queue with the next highest priority that has any DMA commands (e.g., priority queue 230 in this case).

Figure 3:
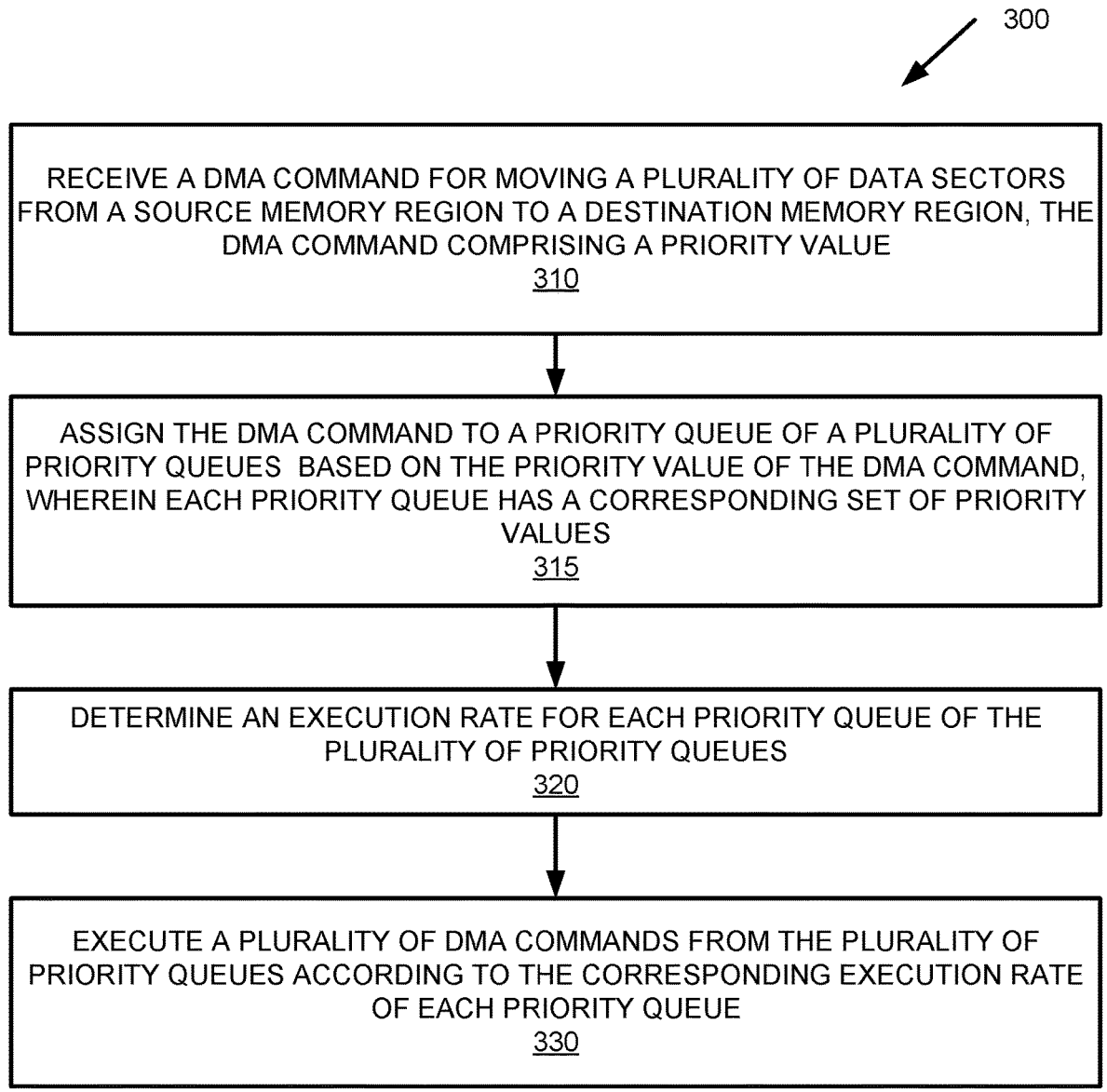
FIG. 3 is a flow diagram of an example method of supporting QoS levels for DMA commands execution in a memory sub-system, in accordance with some embodiments of the present disclosure.

FIG. 3 is a flow diagram of an example method of supporting QoS levels for DMA commands execution in a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by DMA engine QoS component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives a DMA command for a group of data sectors to be moved from a source memory region to a destination memory region. In implementations, the DMA command can be sent to a DMA engine from a DMA command initiator in a memory sub-system that supports multiple levels of QoS. Further, the DMA command can include a priority value indicating the QoS level of the DMA command initiator. The priority value can be used in determining the order of executing the DMA command by a DMA engine, as explained in more details herein above.

At operation 315, the processing logic assigns the DMA command to one of a group of priority queues of the DMA engine based on the priority value of the DMA command. In implementations, each priority queue can have a set of priority values associated with it. A DMA command is assigned to the priority queue that has a priority value matching that of the DMA command. In other implementations, priority queues can be associated with a single priority value, and DMA commands that have a priority value equals to the priority value of the priority queue will be assigned to the priority queue.

At operation 320, the processing logic can determine an execution rate for each priority queue of the DMA engine. The execution rate of a priority queue determines the number of DMA commands that can be selected for execution from the priority queue before switching to the next priority queue of the DMA engine. A priority queue that is associated with high priority values can be assigned a high execution rate (e.g., more DMA commands can be executed from the priority queue). On the other hand, another priority queue that is associated with low priority values can be assigned a low execution rate (e.g., less DMA commands can be executed from the priority queue).

At operation 330, the processing logic executes DMA commands from the priority queues according to the corresponding execution rate of each priority queue. In implementations, the processing logic can start a weighted round robin selection scheme to select DMA commands from the multiple priority queues based on the execution rate of the priority queues, as explained in more details here above.

Figure 4:
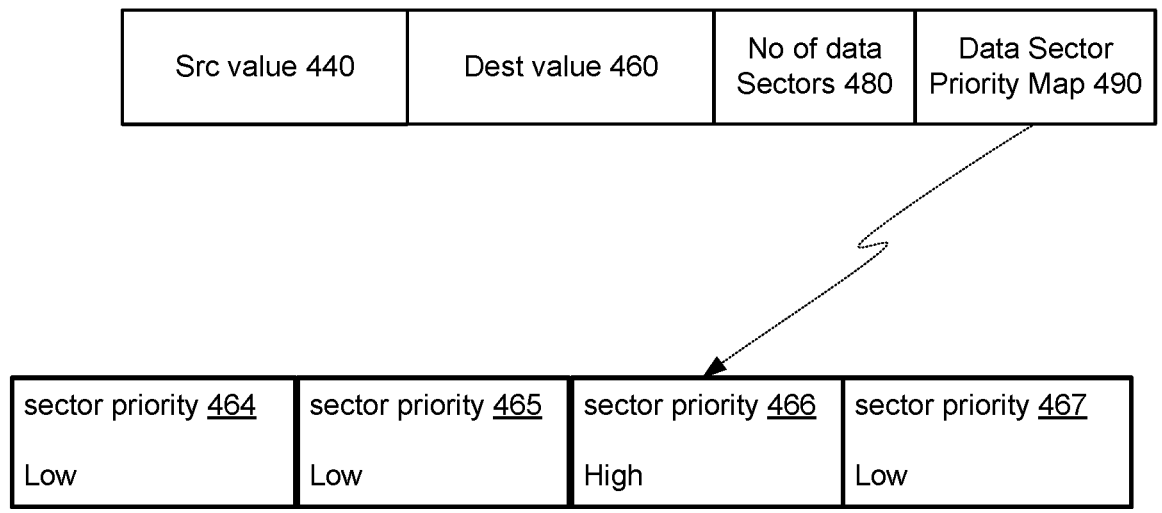
FIG. 4 is a block diagram illustrating an example of fields of a DMA command in a memory sub-system, in accordance with some embodiments of the present disclosure.

FIG. 4 is a block diagram illustrating an example of fields of a DMA command in a memory sub-system, in accordance with some embodiments of the present disclosure. DMA command 400 can contain data fields including source value 440, destination value 460, number of data sectors 480, and data sector priority map 490. In implementations, DMA command can be sent to a DMA engine to move data sectors from a memory region identified by source value 440 to another memory region identified by destination value 460. Number of sectors field 480 can indicate the number of data sectors to be moved as a result of the DMA command, from source memory address identified by source value 440 to destination memory address identified by destination value 460. Data sector priority map 490 can include indications of a sector priority value for each data sector to be moved by executing the DMA command. Sector priority values can determine the order of moving the data sectors, such that certain data sectors can be read, written, or read and written before other data sectors of the same DMA command.

In implementations, data sector priority map 490 can be a data structure containing sector priority values of the data sectors of the DMA command 400. In this case, each data sector of the DMA command can have a corresponding sector priority value in the priority map data structure. For example, if DMA command 400 has four contiguous data sectors to be moved, then sector priority map 490 can have four sector priority fields 464-467, each sector priority field can contain a sector priority value for a corresponding data sector of DMA command 400. In this example, sector priority 464 can indicate that the first data sector of DMA command 400 has a sector priority value of law, sector priority 465 can indicate that the second data sector of DMA command 400 has a sector priority value of law, sector priority 466 can indicate that the third data sector of DMA command 400 has a sector priority value of high, and sector priority 467 can indicate that the fourth data sector of DMA command 400 has a sector priority value of law. In another example, if the data sectors of the DMA command are noncontiguous, each sector priority field of the data sector priority map 490 can also include an identifier of the data sector corresponding to the sector priority value of the sector priority field.

In one implementation, DMA engine QoS component 113 can read the data sectors with the highest sector priority value first, followed by reading the data sectors with second highest priority value and so on. In this case, DMA engine QoS component 113 can identify the third data sector as the data sector with the highest sector priority value. DMA engine QoS component 113 can then read the third data sector from the source memory address identified by source value 440 into a DMA buffer. DMA engine QoS component 113 can then read the three data sectors with sector priority value of law from the source memory address identified by source value 440 into the DMA buffer. When all data sectors of the DMA command 400 have been read from source memory, DMA engine QoS component 113 can write the data sectors from the DMA buffers into the destination memory address identified by destination value 460. For example, DMA engine QoS component 113 can write the third data sector into the destination memory address, then write the three data sectors with sector priority value of law from the DMA buffer into the destination memory address identified by destination value 460.

Figure 5:
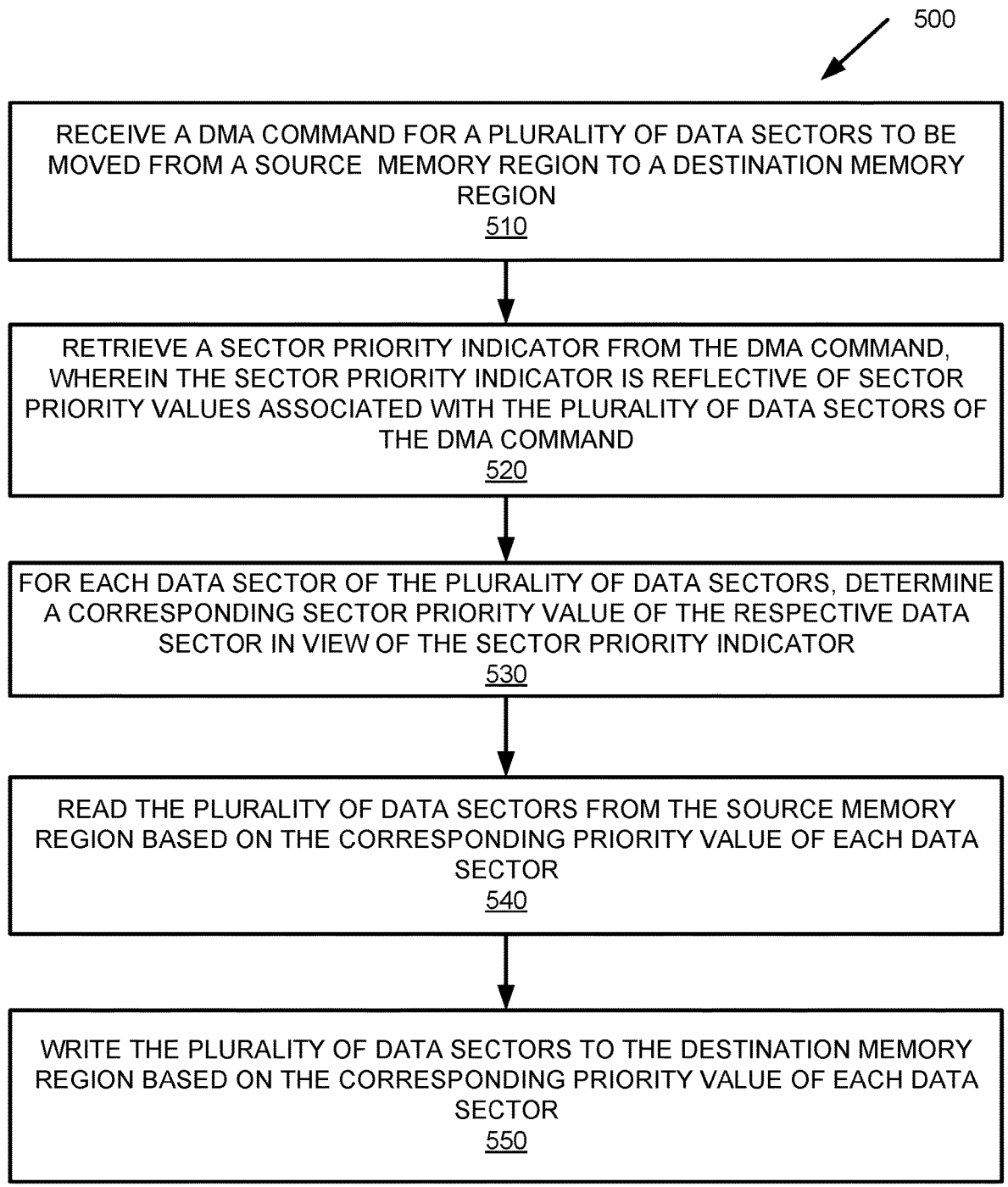
FIG. 5 is a flow diagram of an example method of supporting QoS levels for data sectors within a DMA command in a memory sub-system, in accordance with some embodiments of the present disclosure.

FIG. 5 is a flow diagram of an example method of supporting QoS levels for data sectors within a DMA command in a memory sub-system, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by DMA engine QoS component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic receives a DMA command for moving data sectors from a source memory address to a destination memory address. In implementations, the DMA command can include a data structure indicating the sector priority for the data sectors to be moved by the DMA command, as explained in more details herein.

At operation 520, the processing logic retrieves a sector priority indicator from the DMA command. The sector priority indicator enables the processing logic to determine a sector priority value for the data sectors of the DMA command. In implementations, the sector priority indicator can be a data sector priority map containing a sector priority value for each data sector of the DMA command. In other implementations, the sector priority indicator can be data structure containing a list of ranges of data sectors and a corresponding sector priority value for each range of data sectors, as explained in more details herein.

At operation 530, the processing logic can determine a sector priority value for each data sector to be moved by the DMA command. The processing logic can use the sector priority indicator to make such determination. For example, by parsing the ranges of data sectors associated with a priority value in the sector priority indicator and assign the priority value to each data sector within the range.

At operation 540, the processing logic reads the data sectors of the DMA command from the source memory region based on the corresponding priority value of each data sector. In implementations, the processing logic can read data sectors with high priority values from the source memory into a DMA buffer then read data sectors with low priority values from the source memory into the DMA buffer, as explained in details herein.

At operation 550, the processing logic writes data sectors to the destination memory region based on the corresponding priority value of each data sector. For example, the processing logic can write data sectors with high priority values from the DMA buffer into the destination memory then write data sectors with low priority values from the DMA buffer into the destination memory.

Figure 6:
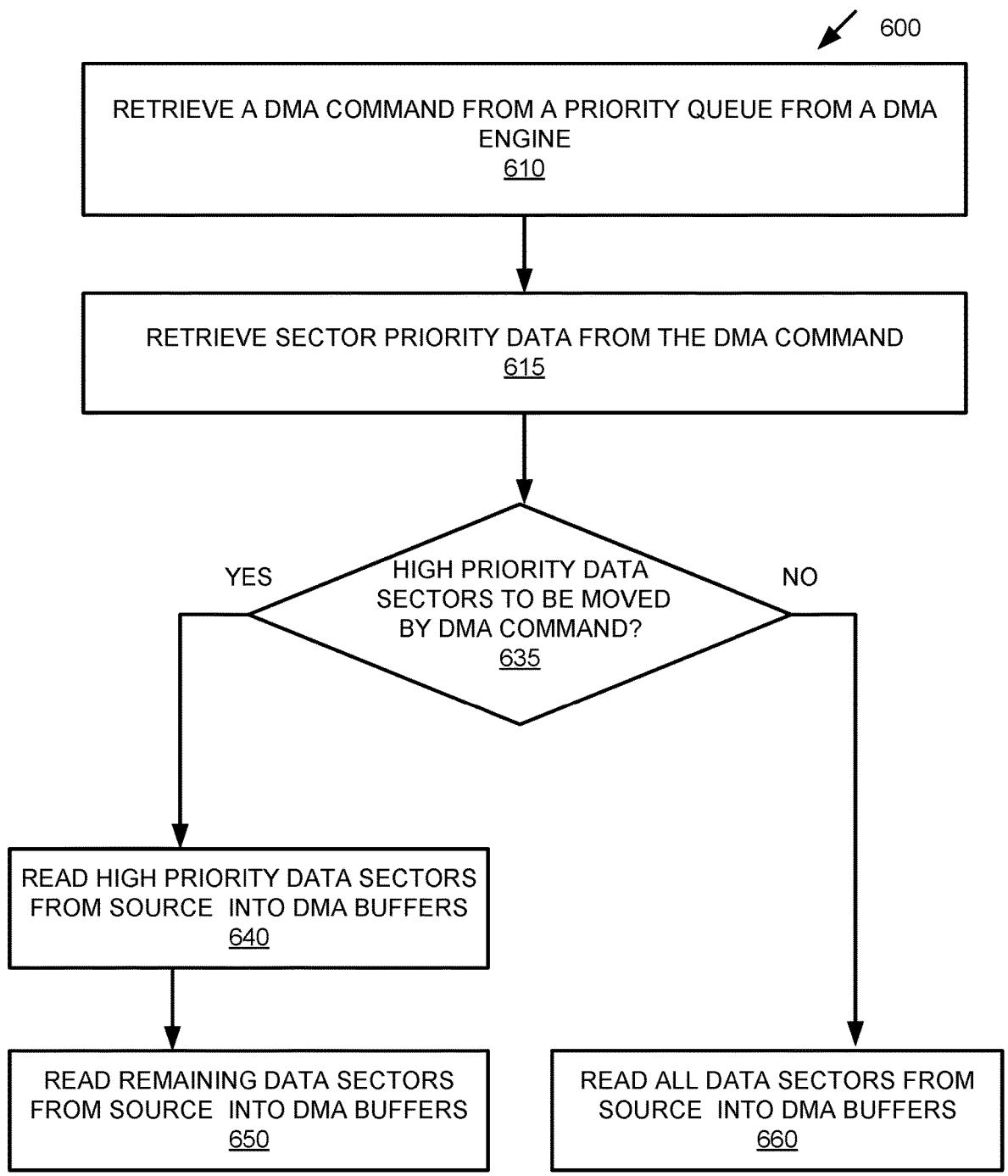
FIG. 6 is a flow diagram of an example method of supporting QoS levels for DMA commands and for data sectors within a DMA command in a memory sub-system, in accordance with some embodiments of the present disclosure.

FIG. 6 is a flow diagram of an example method of supporting QoS levels for DMA commands and for data sectors within a DMA command in a memory sub-system, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by DMA engine QoS component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic receives a DMA command from a priority queue of a DMA engine for processing. In implementations, the DMA command was assigned to the priority queue based on a priority value of the DMA command that matched another priority value associated with the priority queue. In an implementation, the DMA command can be selected for execution according to an execution rate of the priority queue, as explained in more details herein above.

At operation 615, the processing logic retrieves data from the DMA command indicating sector priority values for the data sectors of the DMA command (referred to herein as sector priority indicator). In an example, the sector priority indicator can be a data structure containing a list of ranges of data sectors and a corresponding sector priority value for each range of data sectors. For example, for a DMA command that is initiated to move ten contiguous data sectors from a source memory region to a destination memory region, the sector priority data structure can data items indicating that data sectors 0 to 3 each has a sector priority value of 1, data sectors 4 to 6 each has a sector priority value of 2, and data sectors 7 to 9 each has a sector priority value of 1. In this case, since data sectors 4, 5, and 6 each have a high priority value relative to the other data sectors of the DAM command, data sectors 4, 5, and 6 can be read from the source memory region and then written to the destination memory region before the other data sectors of the DMA command.

At operation 635, the processing logic can determine whether any data sectors of the DMA command has a higher priority value than the other data sectors of the same DMA command. For example, the processing logic may parse the ranges of data sectors and associated priority values of the sector priority indicator to determine whether some data sectors have higher priority values than other.

At operation 640, when the processing logic determines that some data sectors have higher priority values than other data sectors, the processing logic proceeds to read the data sectors with high priority values from the source memory address to DMA buffers of the DMA engine. Reading high priority data sectors enables the processing logic to free the source memory region that was occupied by those data sectors, so that it can be erased, reused, etc., sooner than the memory region occupied by lower priority data sectors. At operation 650, the processing logic reads the remaining data sectors of the DMA command from the source memory address to DMA buffers of the DMA engine At operation 660, if, on the other hand, the processing logic determines that all data sectors have the same priority value, the processing logic determines that all data sectors can be processed at the same level of quality of service. The processing logic then proceeds to read all the data sectors of the DMA command from the source memory address to the DMA buffers.

Figure 7:
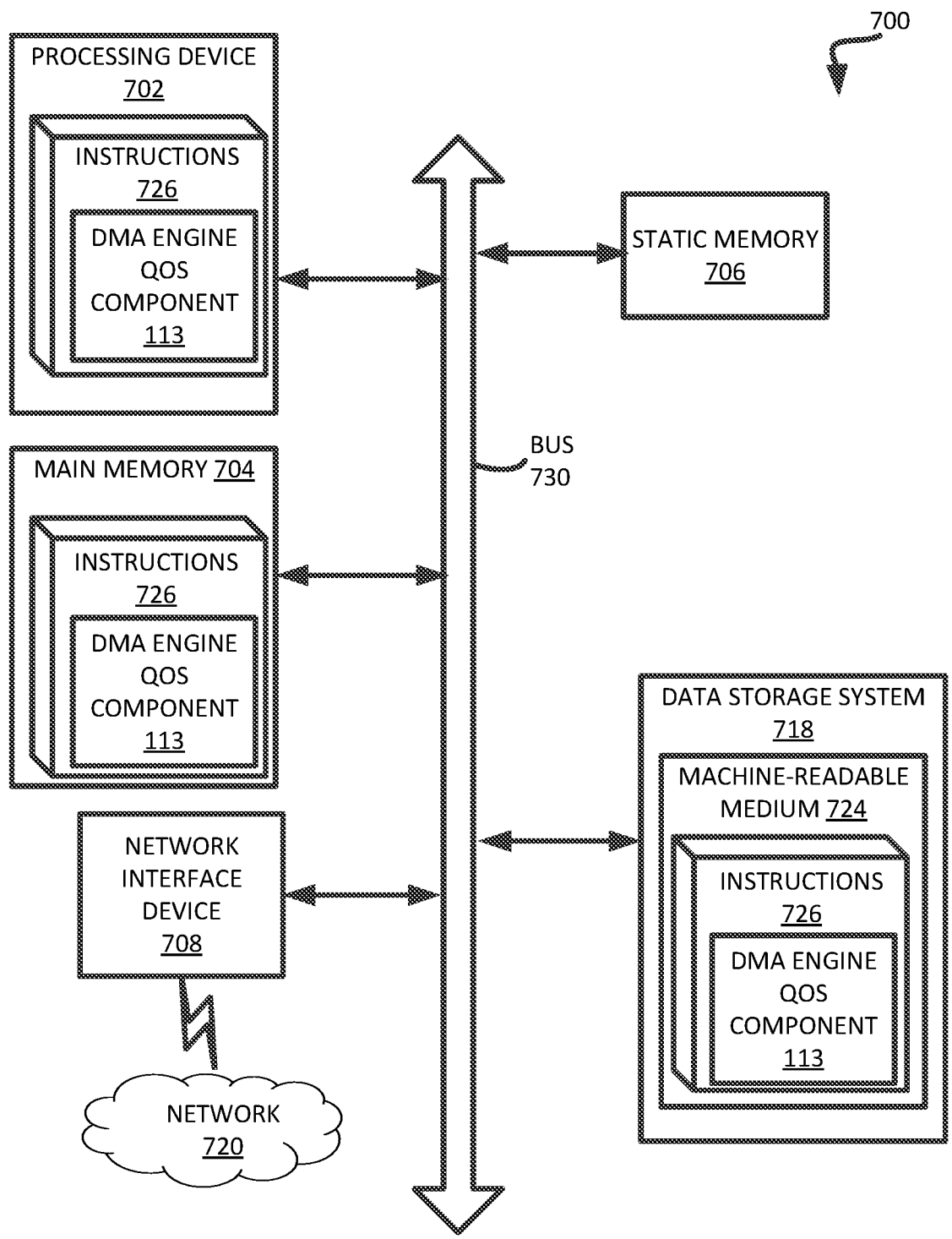
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to DMA engine QoS component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to DMA engine QoS component 113 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a plurality of memory devices;
   a processing device, operatively coupled with the plurality of memory devices, to perform operations comprising:
      receiving a direct memory access (DMA) command indicating a plurality of data sectors to be moved from a source memory region to a destination memory region, the DMA command comprising a priority value;
      assigning the DMA command to a priority queue of a plurality of priority queues based on the priority value of the DMA command, wherein each priority queue has a corresponding set of priority values;
      determining a corresponding execution rate for each priority queue of the plurality of priority queues; and
      executing a plurality of DMA commands from the plurality of priority queues according to the corresponding execution rate of each priority queue.

2. The system of claim 1, wherein the corresponding execution rate of each priority queue is determined based on the corresponding set of priority values of the respective priority queue.

3. The system of claim 2, wherein the corresponding execution rate of each priority queue is a number of consecutive DMA commands to be executed from the respective priority queue before switching to another priority queue.

4. The system of claim 1, wherein the priority value of the DMA command corresponds to a quality of service (QoS) level that is assigned to a memory device associated with the DMA command.

5. The system of claim 1, wherein executing the plurality of DMA commands comprises:
for each DMA command of the plurality of the DMA commands:
determining a corresponding sector priority value for each data sector of the plurality of data sectors of the respective DMA command;
reading the plurality of data sectors of the respective DMA command from the source memory region based on the corresponding sector priority value of each data sector; and
writing the plurality of data sectors of the respective DMA command to the destination memory region based on the corresponding sector priority value of each data sector.

6. The system of claim 5, wherein determining the corresponding sector priority value for each data sector comprises:
retrieving a plurality of data sector priority indicators from the respective DMA command.

7. The System of claim 1 wherein the processing device is to perform operations further comprising:
modifying the execution rate of each priority queue according to a predetermined criteria.

8. A method comprising:
receiving, by a processing device, a DMA command for moving a plurality of data sectors from a source memory region to a destination memory region, the DMA command comprising a priority value;
assigning, by the processing device, the DMA command to a priority queue of a plurality of priority queues based on the priority value of the DMA command, wherein each priority queue has a corresponding set of priority values;
determining, by the processing device, a corresponding execution rate for each priority queue of the plurality of priority queues; and
executing, by the processing device, a plurality of DMA commands from the plurality of priority queues according to the corresponding execution rate of each priority queue.

9. The method of claim 8, wherein the corresponding execution rate of each priority queue is determined based on the corresponding set of priority values of the respective priority queue.

10. The method of claim 9, wherein the corresponding execution rate of each priority queue is a number of consecutive DMA commands to be executed from the respective priority queue before switching to another priority queue.

11. The method of claim 8, wherein the priority value of the DMA command corresponds to a quality of service (QoS) level that is assigned to a memory device associated with the DMA command.

12. The method of claim 8, wherein executing the plurality of DMA commands further comprises:
for each DMA command of the plurality of the DMA commands:
determining a corresponding sector priority value for each data sector of the plurality of data sectors of the respective DMA command;
reading the plurality of data sectors of the respective DMA command from the source memory region based on the corresponding sector priority value of each data sector; and
writing the plurality of data sectors of the respective DMA command to the destination memory region based on the corresponding sector priority value of each data sector.

13. The method of claim 12, wherein determining the corresponding sector priority value for each data sector further comprises:
retrieving a plurality of data sector priority indicators from the respective DMA command.

14. The method of claim 8 further comprises:
modifying the execution rate of each priority queue according to a predetermined criteria.

15. A non-transitory computer-readable storage medium comprising instructions that, when executed by a processing device, cause the processing device to:
receive a DMA command for a plurality of data sectors to be moved from a source memory region to a destination memory region;
retrieve a sector priority indicator from the DMA command, wherein the sector priority indicator is reflective of sector priority values associated with the plurality of data sectors of the DMA command;
for each data sector of the plurality of data sectors, determine a corresponding sector priority value of the respective data sector in view of the sector priority indicator;
read the plurality of data sectors from the source memory region based on the corresponding sector priority value of each data sector; and
write the plurality of data sectors to the destination memory region based on the corresponding sector priority value of each data sector.

16. The non-transitory computer-readable storage medium of claim 15, wherein the sector priority indicator comprises a set of priority values, wherein each priority value of the set of priority values is assigned to a corresponding range of data sectors of the plurality of data sectors.

17. The non-transitory computer-readable storage medium of claim 15, wherein the sector priority indicator comprises a sector priority map data structure, the sector priority map data structure comprising a corresponding sector priority value for each data sector of the plurality of data sectors.

18. The non-transitory computer-readable storage medium of claim 17, wherein the sector priority value of each data sector is a value relative to the sector priority values of other data sectors of the DMA command.

19. The non-transitory computer-readable storage medium of claim 15, wherein to read the plurality of data sectors from the source memory region, the processing device is further to:
store the plurality of data sectors into a DMA buffer.

20. The non-transitory computer-readable storage medium of claim 19, wherein to write the plurality of data sectors to the destination memory region, the processing device is further to:
retrieve the plurality of data sectors from the DMA buffer.

* * * * *